United States Patent [19]
Kondo

[11] Patent Number: 4,716,473
[45] Date of Patent: Dec. 29, 1987

[54] DEVICE FOR MODIFYING PROGRAM DURATION ON A TAPE PLAYER

[75] Inventor: Shigeyuki Kondo, Tokyo, Japan
[73] Assignee: NEC Corporation, Tokyo, Japan
[21] Appl. No.: 936,916
[22] Filed: Nov. 26, 1986

Related U.S. Application Data
[63] Continuation-in-part of Ser. No. 521,796, Aug. 9, 1983, abandoned.

[30] Foreign Application Priority Data
Aug. 9, 1982 [JP] Japan ............... 57-138322

[51] Int. Cl.⁴ ............. H04N 5/78; G11B 21/04; G11B 15/52
[52] U.S. Cl. ............. 360/9.1; 360/10.3; 360/70; 360/73
[58] Field of Search ............. 360/9.1, 10.3, 70, 73

[56] References Cited
U.S. PATENT DOCUMENTS

| | | | |
|---|---|---|---|
| 3,939,490 | 2/1976 | Opett | 360/70 X |
| 4,037,260 | 7/1977 | Busby, Jr. et al. | 360/70 X |
| 4,206,485 | 6/1980 | Sakamoto | 360/70 |
| 4,318,140 | 3/1982 | Shigeta | 360/10.3 |
| 4,358,798 | 11/1982 | Hedlund et al. | 360/73 |
| 4,393,415 | 7/1983 | Huist | 360/9.1 |
| 4,463,390 | 7/1984 | Koga et al. | 360/10.3 |
| 4,611,252 | 9/1986 | Igata et al. | 360/73 X |

FOREIGN PATENT DOCUMENTS

| | | | |
|---|---|---|---|
| 0098518 | 8/1979 | Japan | 360/10.3 |
| 0133086 | 8/1983 | Japan | 360/10.3 |

*Primary Examiner*—Aristotelis M. Psitos
*Attorney, Agent, or Firm*—Sughrue, Mion, Zinn, Macpeak & Seas

[57] ABSTRACT

An apparatus for modifying the playing time of a program including a signal converter (1) for converting a signal ($S_1$) corresponding to the difference between the time content and the desired playing time of a program to a tape-speed-varying signal ($\Delta T_D$) and a reference-signal-varying signal ($\Delta T_p$). The tape-speed-varying signal controls a delay (5) of a detected capstan signal ($T_D$). The delayed and nondelayed capstan signal are phase compared (4) to produce a speed control voltage. The tape-speed-varying signal varies the frequency of the capstan reference signal ($T_P$) in a reference signal generator (2). The capstan reference signal is then phase compared (3) with a signal regenerated from the control track of the tape to produce a phase control voltage. An adder (6) adds the speed and phase control voltages to produce a signal to drive the capstan motor.

2 Claims, 4 Drawing Figures

DEVICE FOR MODIFYING PROGRAM DURATION ON A TAPE PLAYER

BACKGROUND OF THE INVENTION

This application is a continuation-in-part of application Ser. No. 521,796, filed Aug. 9, 1983, and now abandoned.

The present invention relates to an apparatus for shortening and/or extending the duration of program playing time for a program on a tape player.

In television broadcasting, programs previously recorded on video tape are reproduced for broadcasting on the air. In such a case, if the total playing time of the prepared tape content is not in agreement with the planned playing time, the content may last less than the planned period of time or, conversely, may last for more than the planned period of time on the program. Generally, therefore, the playing time of the content and the scheduled playing time have to be strictly controlled and seldom differ from each other significantly.

However, error can develop to the extent, for instance, that the content of a program scheduled to run for one hour is actually 59 minutes and 59 seconds, and some remedy is required to cope with this problem. Further, a program scheduled to last for one hour may actually have a playing time of, for example, about 63 minutes, and it may then be required, depending upon the type of the program, to compress the content by three minutes, instead of simply cutting the final portion of the program by 3 minutes. In the former case, the objective can be accomplished by lowering the tape speed by a factor of about 1/3600 (about 0.03%). In the latter case, the objective can be accomplished by increasing the tape speed by a factor of about 3/60 (5%).

It is, however, very difficult to stably control the tape speed over a wide range of from about 1/10000 to about 1/100. So far, nonetheless, the time content and the actual playing time must be brought into agreement at least in part by increasing or decreasing the tape speed.

SUMMARY OF THE INVENTION

It is, therefore, an object of the present invention to provide an apparatus for shortening and/or extending the time for playing a program and which is capable of varying the tape speed by very small amounts to relatively large amounts while maintaining stability.

According to the present invention, there is provided a program playing time shortening and/or extending apparatus comprising:

a signal source generating a difference signal corresponding to a difference between a time constant of a program and a playing time;

signal producing means responsive to said difference signal for producing a tape-speed-varying signal and a reference-signal-varying signal;

capstan tack signal generating means coupled to said capstan motor for generating a capstan tack signal corresponding to the running speed of said capstan motor;

capstan tack delay means coupled to said capstan tack signal generating means and said signal producing means for delaying said capstan tack signal by such a time that is varied by said tape-speed-varying signal to produce a delayed tack signal;

first phase comparing means for comparing said capstan tack signal and said delayed tack signal to generate a first speed control signal;

signal receiving means for receiving a capstan reference signal having a predetermined period that serves as a reference for a normal tape speed;

means coupled to said signal receiving means and said signal producing means for varying said predetermined period of said capstan reference signal by said reference-signal-varying signal;

control track signal producing means for producing a control track signal from a control track of a tape, said control track signal indicating a video frame period on said tape in which said capstan reference signal has been recorded;

second phase comparing means for comparing said capstan reference signal with the varied period and said control track signal to generate a second speed control signal; and adder means for adding said first and second speed control signals to generate a third speed control signal, wherein a speed of said capstan motor is controlled by said third speed control signal.

BRIEF DESCRIPTION OF THE DRAWINGS

Features and advantages of the present invention will be more apparent from the following description of a preferred embodiment of the present invention taken in conjunction with the accompanying drawings, wherein.

DETAILED DESCRIPTION OF THE PREFERRED EMBODIMENTS

In a capstan servo system which has heretofore been employed in VTRs (video tape recorders), the tape speed is controlled by a closed loop using a control track to absorb variances between different reproduction apparatuses and to absorb variances in the tape speed that arise from differences in recording and reproducing conditions. That is, during recording, the signals in synchronism with the image signals are recorded in the lengthwise direction of the tape, and during reproduction, the signals are phase compared with reference signals supplied from an external unit to thereby control the speed of the tape. The track along the lengthwise direction of the tape used for this purpose is called a control track, and the signals are called control track signals. Provision is also made for a closed loop to control the speed of the capstan motor in order to prevent loop oscillation while the signal phases are being compared and to set the center value of the tape speed. As will be obvious from the above description, therefore, to stably vary the tape speed, it is necessary to:

(1) vary the reference signal that serves as a reference for the control track signals; and (2) vary the center value of the rotational speed of the capstan motor.

The invention will be described below in detail in conjunction with the drawings.

Figure 1:
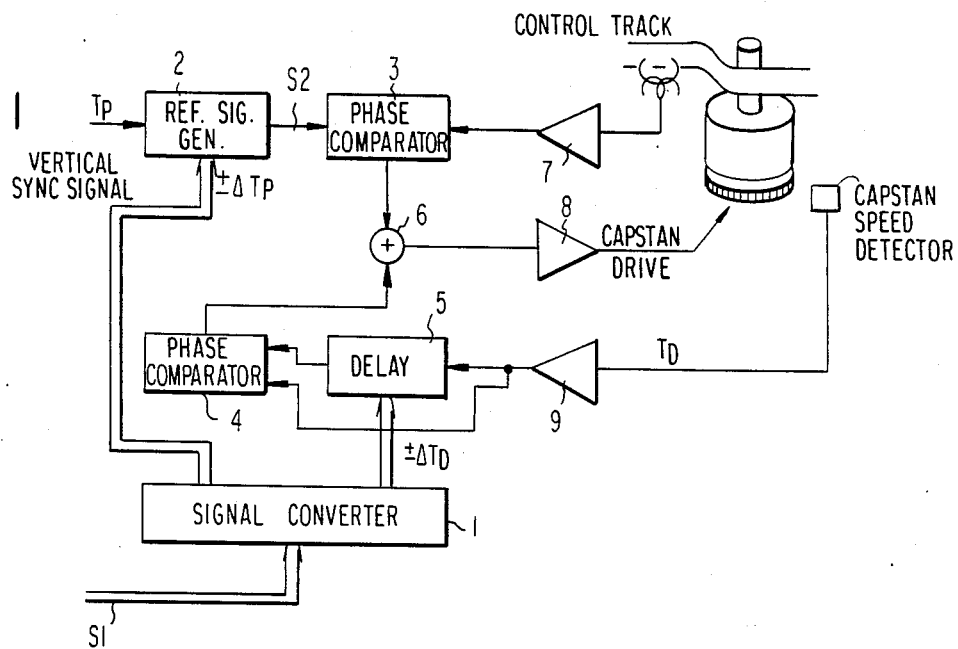
FIG. 1 is a block diagram of an embodiment of the present invention.

FIG. 1 is a block diagram illustrating a preferred embodiment of the present invention, in which $S_1$ denotes a digital signal which corresponds to a difference between the time content of the program and the scheduled playing time, and which is given by the ratio of the difference between the time content and the playing time, with the sign of the ratio included. For instance, if the time content is 59 minutes and 59 seconds, and the scheduled playing time is 60 minutes, the digital signal $S_1$ is given by:

$$\frac{(60 \text{ minutes}) - (59 \text{ minutes and } 59 \text{ seconds})}{(60 \text{ minutes})} +$$

$$1/3600 \approx +0.3\%$$

It should be noted that a plus sign (+) on the right-hand side of the equation indicates a reduction of the tape speed and a minus sign (−) indicates an increase of the tape speed.

A signal converter 1 receives the signal $S_1$ and produces a tape-speed-varying signal $\pm \Delta T_D$ and a reference-signal-varying signal $\pm \Delta T_P$. In this case, the tape-speed-varying signal $\Delta T_D$ and the reference-signal-varying signal $\Delta T_P$ have values corresponding to the value of the signal $S_1$. Therefore, if the signal $S_1$ has a value of $\pm 0.03\%$, both the signals $\pm \Delta T_P$ and $\pm \Delta T_D$ have values corresponding to $\pm 0.03\%$. The signals $\pm \Delta T_D$ and $\pm \Delta T_P$ will be described later in detail. The reference-signal-varying signal $\pm \Delta T_P$ produced by the signal converter 1 serves as an input to a reference signal generator 2 which produces a variable capstan reference signal $S_2$.

Figure 2:
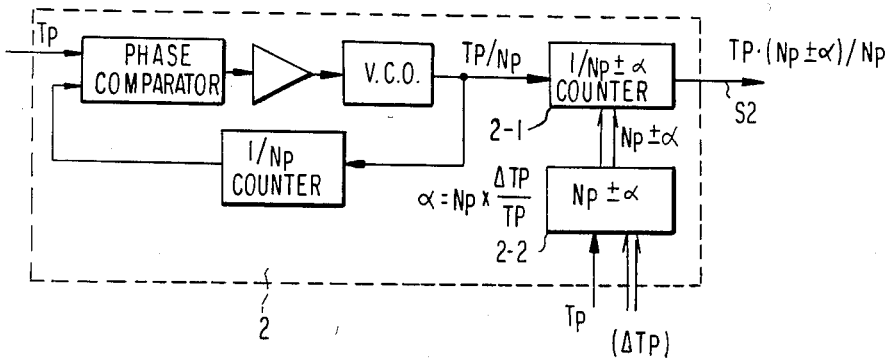
FIGS. 2 and 3 are block diagrams of portions of the embodiment shown in FIG. 1.

FIG. 2 is a block diagram which illustrates the reference signal generator 2 in greater detail. As shown in FIG. 2, the capstan reference signal $T_P$ (having a period $T_P$) serves as a reference signal for the PLL, which is composed of a phase comparator, an error amplifier, a VCO (voltage-controlled oscillator), and a $1/N_P$ counter. The capstan reference signal $T_P$ is a synchronizing reference signal with which the tape player operates in synchronism, and, generally, it is the vertical synchronizing signal. The VCO produces a signal having a frequency $N_P$ times that of the capstan reference signal. The signal $\pm \Delta T_P$, on the other hand, is sent to an adder/subtractor circuit 2-2 which produces a digital signal ($N_P \pm \alpha$). Here, the signals $T_P$, $\Delta T_P$, $N_P$ and $\alpha$ establish a relation:

$$\alpha \approx N_P(\Delta T_P/T_P)$$

Figure 4:
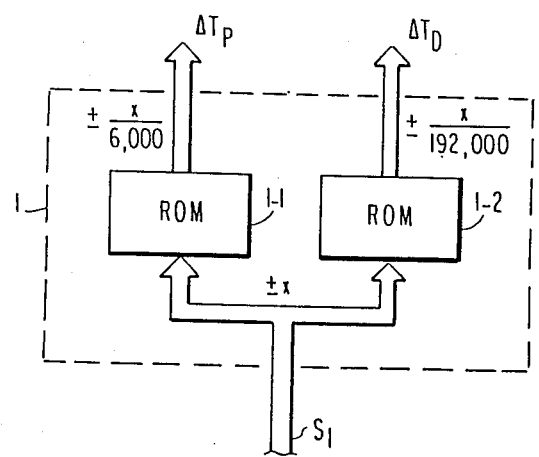
FIG. 4 is a block diagram of a signal converter in FIG. 3.

The signals $T_P$ and $\Delta T_P$ are analog quantities having units of time, while the quantities $N_P$ and $\alpha$ are unitless digital quantities. For example, it is assumed that the frequency of the reference signal is 60 Hz and that the number $N_P$ is 10,000. In this case, for a signal $S_1$ of $\pm x$ %, the reference-signal-varying signal $\Delta \pm T_P$ is expressed by $\pm(1/60)\cdot(x/100)$. In the signal converter 1, conversion between signal $S_1$ and the reference-signal-varying signal $\Delta T_P$ is performed. For example, as shown in FIG. 4, such a conversion can easily be performed by utilizing a read-only memory (ROM) 1-1 in which is stored a conversion table. It need not be pointed out that any required degree of precision can be obtained merely by making $N_P$ appropriately large. The output of the adder/subtractor circuit 2-2 serves as an input to a counter 2-1, which transforms the output of the VCO into $1/(N_P \pm \alpha)$. It will therefore be recognized that the period of the variable capstan reference signal produced by the counter 2-1 is given by $T_P(N_P \pm \alpha)/N_P$. Further, the tape-speed-varying signal $\pm \Delta T_D$ produced by the signal converter 1 serves as an input to a capstan tack delay circuit 5.

Figure 3:
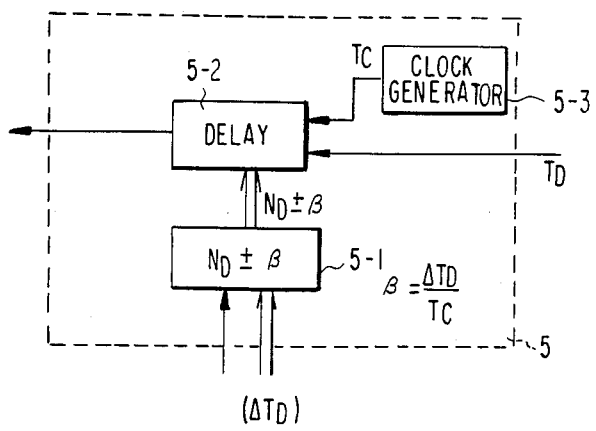

The delay circuit 5 is shown in further detail in the block diagram of FIG. 3. An adder/subtractor circuit 5-1 receives the tape-speed-varying signal $\pm \Delta T_D$, performs addition and subtraction of predetermined values $N_D$ and $\beta$, and produces an output. Here, $\beta \approx \Delta T_D/T_C$, where $T_C$ denotes the period of clock signals produced by a clock generator 5-3. By sufficiently increasing the clock frequency, the period $T_C$ can be reduced to obtain a required precision. In FIG. 3, a delay unit 5-2 delays the capstan tack signal by $T_C \cdot (N_D \pm \beta)$. For example, assuming that the frequency of the capstan tack signal $T_D$ is 1920 Hz (32 times the vertical synchronizing frequency), the frequency of the clock signal $T_C$ is about 2 MHz ($1024 \times 1920$ Hz), and further that $N_D$ is set to 1024, the tape-speed-varying signal $\pm \Delta T_D$ is expressed by $\pm(1/1920)\cdot(x/100)$, where the signal $S_1$ is indicated by $\pm x\%$. The conversion from the signal $S_1$ to the tape-speed-varying signal $\pm \Delta T_D$ can be also performed utilizing a ROM 1-2 in the signal converter 1 (FIG. 4).

In FIG. 1, reference numeral 4 denotes a phase comparing circuit which receives the delayed capstan tack signal and the nondelayed capstan tack signal and detects a phase difference between the delayed capstan tack signal and the nondelayed capstan tack signal to produce a speed voltage corresponding to the tape speed. In this case, if the delay time of the delay circuit 5 is constant, the phase difference is varied in proportion to the frequency of the capstan tack signal. Conversely, if the delay time of the delay circuit 5 is controlled, the frequency of the capstan tack signal will change, i.e., the capstan speed can be controlled. The circuit 4 works in the same manner as in the conventional method of detecting speed. A possible structure of the phase comparing circuit 4 is shown in, for example, FIG. 15 of U.S. Pat. No. 4,463,390 as the element denoted by reference numeral 19. As described above, however, the delayed capstan tack signal can be controlled by the tape-speed-varying signal $\pm \Delta T_D$. It will therefore be understood that the center value of the speed is varied. In FIG. 1, reference numeral 9 denotes a preamplifier for detecting the rotational speed of the capstan motor, 7 denotes a control track preamplifier, and 8 denotes an amplifier for driving the capstan motor.

Reference numeral 3 denotes a phase comparing circuit which compares the phase of the thus-obtained variable capstan reference signal $S_2$ with the phase of a control track signal produced by the control track preamplifier 7, and which resultingly produces a phase control voltage. The speed control voltage produced by the phase comparing circuit 4 and the phase control voltage produced by the phase comparing circuit 3 are added together by an adder 6, and the sum is applied to the drive amplifier 8. In the aforedescribed embodiment, the signal converter 1 produces the reference-signal-varying signal and the tape-speed-varying signal expressed by $\pm \Delta T_P$ and $\pm \Delta T_D$, respectively. Otherwise, it is also possible to use directly as the reference-signal-varying signal and the tape-speed-varying signal the quantities expressed by $\pm \alpha$ and $\pm \beta$, which are explained above. The usage of $\pm \alpha$ and $\pm \beta$ can make the circuit configuration simple.

Although the present invention has been described in detail in the foregoing, it is also possible to calculate digital signals corresponding to the difference between the time of content of program of $S_1$ and the playing time, and input such signals using thumbwheel switches or the like. It is further possible to add an external simply constructed arithmetic circuit to independently input the time content of the program and the scheduled playing time, and to simply calculate a digital signal which corresponds to the difference.

What is claimed is:

1. A program playing time duration modifying apparatus to be coupled with a capstan motor for feeding a tape, comprising:
a signal source generating a difference signal corresponding to a difference between a time constant of a program and a playing time;
signal producing means (1) responsive to said difference signal for producing a tape-speed-varying signal and a reference-signal-varying signal;
capstan tack signal generating means coupled to said capstan motor for generating a capstan tack signal corresponding to the running speed of said capstan motor;
capstan tack delay means (5) coupled to said capstan tack signal generating means and said signal producing means for delaying said capstan tack signal by a time that is varied by said tape-speed-varying signal to produce a delayed tack signal;
first phase comparing means (4) for comparing said capstan tack signal and said delayed tack signal to generate a first speed control signal;
signal receiving means for receiving a capstan reference signal having a predetermined period that serves as a reference for a normal tape speed;
period varying means (2) coupled to said signal receiving means and said signal producing means for varying said predetermined period of said capstan reference signal by said reference-signal-varying signal;
control track signal producing means (7) for producing a control track signal from a control track of a tape, said control track signal indicating a video frame period on said tape in which said capstan reference signal has been recorded;
second phase comparing means (3) for comparing said capstan reference signal with the varied period and said control track signal to generate a second speed control signal; and
adder means (6) for adding said first and second speed control signals to generate a third speed control signal, wherein a speed of said capstan motor is controlled by said third speed control signal.

2. An apparatus as claimed in claim 1, wherein said period varying means (2) comprises:
a phase locked loop for generating a clock signal having a frequency $N_P$ times a frequency of said capstan reference signal;
adding means for adding a value corresponding to said reference-signal-varying signal to the value of $N_P$ to produce a frequency dividing factor; and
frequency counting means for frequency-dividing said clock signal by said frequency-dividing factor to generate said capstan reference signal.

* * * * *

UNITED STATES PATENT AND TRADEMARK OFFICE
CERTIFICATE OF CORRECTION

PATENT NO. : 4,716,473

DATED : December 29, 1987

INVENTOR(S) : KONDO

It is certified that error appears in the above-identified patent and that said Letters Patent is hereby corrected as shown below:

COLUMN 3, LINE 7   Delete "+0.3%" and add --+0.03%--;

COLUMN 3, LINE 19  Delete "±0.03%" and add --+0.03%--

COLUMN 3, LINE 21  Delete "±0.03%" and add --+0.03%--

Signed and Sealed this

Twenty-third Day of August, 1988

Attest:

DONALD J. QUIGG

*Attesting Officer*    *Commissioner of Patents and Trademarks*